United States Patent Office 2,794,289
Patented June 4, 1957

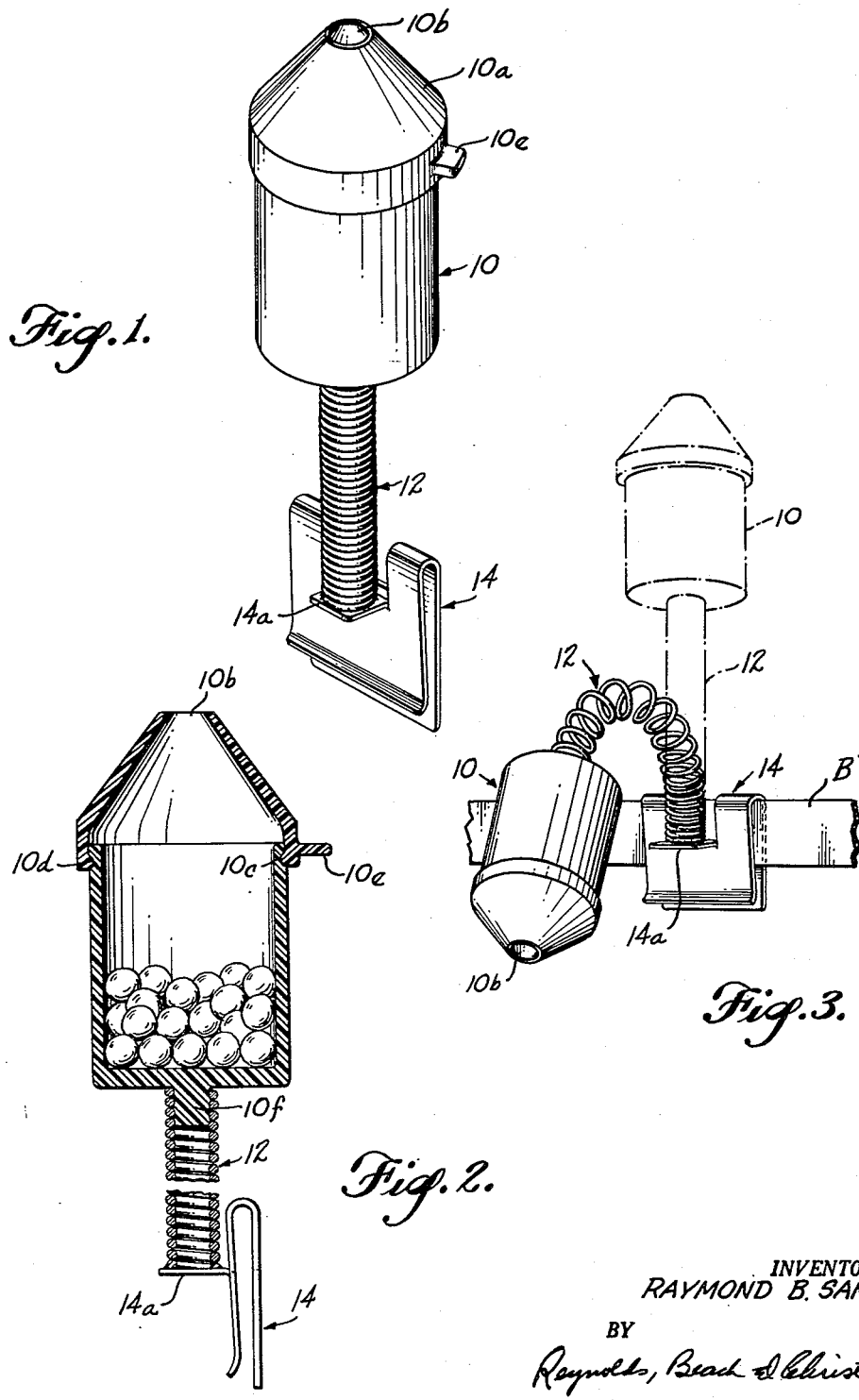
June 4, 1957  R. B. SANFORD  2,794,289
SALMON EGG DISPENSING CONTAINER DEVICE
Filed June 29, 1954
INVENTOR.
RAYMOND B. SANFORD
BY
Reynolds, Beach & Christensen
ATTORNEYS

2,794,289
SALMON EGG DISPENSING CONTAINER DEVICE

Raymond B. Sanford, Kent, Wash.

Application June 29, 1954, Serial No. 440,161

2 Claims. (Cl. 43—55)

This invention relates to an improved dispensing container for individual salmon eggs which are popular as bait in trout fishing. The invention is particularly concerned with a device of that type which may be worn by the fisherman at a handy location for ready accessibility and use, such as on the trousers' belt. The invention is herein illustratively described by reference to its presently preferred form; however, it will be evident that certain changes and modifications in respect to details may be made without departing from the essential features involved.

As is well known, separate or single salmon eggs for bait in trout fishing are customarily put up in small glass jars with screw-down lids. Under actual fishing conditions it is difficult to manipulate the cover of the egg jar while holding on to the fishing pole and to the line and leader in order to rebait the hook. Because of these inconveniences, many fishermen carry a few eggs in one hand while they fish, and thus have an immediately available supply of eggs in order to rebait the hook quickly as is often necessary in order to place fresh bait before a fish while the latter is still in the vicinity and in the mood to strike. Some fisherman simply dump a supply of single eggs in a jacket pocket where they will be readily accessible, but the eggs are smelly and messy and sometimes become crushed under those conditions. There has been an obvious need, therefore, to provide a single egg dispensing container which could be worn by the fisherman in a convenient position in order to dispense individual eggs as needed conveniently and quickly and without the necessity of manipulating closure elements or the like. A number of devices intended for that purpose have been proposed and used in the past, but most of these have been relatively expensive and complicated, while many have been relatively inconvenient to use.

An object of the present invention is a salmon egg dispensing container which may be worn by a fisherman on the trousers' belt or on some other item of wearing apparel and which may be manipulated very conveniently and reliably to dispense salmon eggs one at a time therefrom as needed.

Another object of the invention is a relatively simple and inexpensive salmon egg dispensing device which may be easily operated with one hand and without visual observation.

Another object is a device of the type described which is self-righting and assumes an unobtrusive position on the wearer so that it will not get in the way or be likely to become upset and spill its contents.

A very important object of the invention is a salmon egg dispensing device of the type described which is particularly advantageous in the manner of mounting its dispensing container which will avoid the usual difficulty encountered with prior devices of eggs becoming stuck together in a mass, hence difficult to jar loose for removal of individual eggs through the dispensing opening. In accordance with the present invention, the dispensing container is so mounted that it is a comparatively easy matter to shake the same as violently as necessary in order to loosen individual eggs and cause them to drop through the dispensing opening as needed.

In its illustrated form the novel dispensing container device comprises a normally upright container of generally cylindrical form having a frusto-conical cover with a restricted egg dispensing opening therein, mounting means preferably of the type adapted for securement to the trousers' belt of the fisherman, and an elongated resiliently flexible container support member preferably in the form of a helical spring secured at one end to said mounting means and projecting generally upwardly therefrom and being supportingly connected at its opposite end to the egg container for holding the latter in its normal position by reason of the inherent stiffness of said spring. The length and resilient flexibility of the spring permits the container to be grasped in one hand and tilted downwardly with the palm of the hand placed in receiving position beneath the dispensing opening, and in case the salmon eggs become stuck together inside the container, the free length and flexibility of the supporting spring permits the container to be easily shaken as violently as necessary or jarred against the mounting means or other relatively firm surface in order to separate the eggs so as to dispense one or more individual eggs through the opening.

These and other features, objects and advantages of the invention will become more fully evident from the following description by reference to the accompanying drawings.

Figure 1 is a perspective view of the improved dispensing container.

Figure 2 is a longitudinal sectional view of the same, illustrating certain details of construction of the preferred form thereof.

Figure 3 is a view of the device mounted on a trousers' belt and in use, the view including a broken line showing of the container in its normal position and a solid line showing of the container in egg dispensing position.

Referring to the drawings, the container 10, preferably of generally cylindrical form, has a snap-on cover 10a which is conveniently of frusto-conical form having a central egg dispensing opening 10b in the apex thereof of a size or diameter sufficient to pass the largest single salmon egg likely to be encountered, but preferably sufficiently restricted to prevent passage of two or more eggs at a time therethrough. Preferably the container body and cover are manufactured of a relatively light weight plastic material which for convenience, at least as to the container proper, is of a transparent nature so that the contents of the container may be viewed through its walls without removing the cover. Lucite is a suitable plastic, and there are numerous others which will likewise serve the purpose. It is expressly understood, however, that suitable materials which may be used in the different parts of the device may vary in accordance with preference or choice. Lightness of weight is a desirable characteristic of the container material, since, as will subsequently appear, an excessively heavy container will require a resilient support which is stiffer than might otherwise be desired.

Since most plastic substances are somewhat flexible, an effective snap-on type connection between the cover 10a and the container body in the illustrative case is provided by a lip 10c formed around the inside of the base of the cover, which lip presses into a complemental groove 10d formed around the outer surface of the container body near the rim thereof when the two parts are pressed together. An outwardly projecting thumb tab 10e is provided for convenience in prying the cover loose when it is necessary to refill the container.

While the size and capacity of the container may vary, it is preferred that it be of the order of size which will permit it to contain approximately half the contents of the standard size jar of individual salmon eggs sold for sports fishing. Thus the container may be approximately one and three quarters inches high, and one and one-half inches in diameter.

The bottom of the container has a nub or boss 10f projecting downwardly from the center thereof. An elongated helical spring 12, serving as the container support, securely engages the nub 10f by threading the upper end of the spring over the latter. This is the preferred method of connecting the supporting spring 12 to the container; however, other arrangements accomplishing a like purpose may obviously be used in lieu thereof.

The lower end of the spring 12 is brazed or otherwise secured to a horizontal tab or bracket 14a projecting outwardly from the mounting means 14. The mounting means 14 is preferably in the form of a hook or clip of resilient metal adapted to receive and tightly hold a trousers' belt between the front and rear flanges or leaves of the clip. In Figure 3 the mounting clip 14 is shown secured to the trousers; belt B as viewed from the front side of the wearer. The dotted line showing of the container 10 and the supporting spring 12 represents the normal position of the supported container. In this position the spring projects generally upwardly from the mounting clip and holds the container in upright position. The length of the spring may vary somewhat, but it is found for convenience, with the particular size of container mentioned above, that a helical spring approximately two and one-half inches long and seven-sixteenths of an inch outside diameter is a satisfactory size. This spring should have sufficient stiffness to hold the container 10 in its normal position and to return it to its normal position in case it is deflected therefrom, as in use or when the container is brushed against an object accidentally. At the same time, the spring should be sufficiently flexible to permit the container to be grasped in the hand and inverted for dispensing a salmon egg as shown in the solid line position in Figure 3. The length of the spring should be such that the container may be shaken bodily from side to side or may be struck against the belt or against the mounting clip 14 if necessary, in order to jar loose individual eggs which have become stuck together inside the container 10. Moreover, the length of the spring is sufficient to permit holding the container outwardly away from the trousers when the container is in the dispensing position so that any juices or liquids which run out the container will not drop onto the trousers.

The convenience of using such a device to dispense salmon eggs will be readily apparent. The preferred technique is to grasp the container in one hand with the palm of the hand directly overlying the cover opening, whereupon the container is inverted and shaken in order to dislodge one or more single eggs contained therein. The one or more eggs thus loosened and permitted to roll downwardly through the dispensing opening 10b are then caught in the hand. Thereupon the container is released and the resilient stiffness of the supporting spring 12 causes it to swing upwardly into its normal upright position as shown by broken lines in Figure 3. The dispensing operation is very simple and requires no visual observation; the device may be reliably operated entirely by feel. Moreover, no movable closure elements, gates, plugs or other similar manually operated devices are required to be used. The freedom of movement of the container permitted by the elongated resilient member 12 is a very important advantage in the convenience of shaking loose and dispensing individual salmon eggs through the container opening.

These and other aspects of the invention will be evident to those skilled in the art, it being understood that the invention is not limited to the specific details of construction and that the same principles may be applied to the mounting of salmon egg dispensing containers on the rails of sports fishing boats, or in other places where such devices are to be used. The preferred application of the invention, however, is in those forms in which the device is adapted to be worn directly on the person.

I claim as my invention:

1. A salmon egg dispensing container device of the type adapted to be worn by a fisherman comprising a normally upright container for salmon eggs, said container having a removable cover of generally frusto-conical form with a salmon egg dispensing opening in the upper end thereof of restricted size to pass individual salmon eggs therethrough, mounting means adapted for securement in predetermined position to an article of wearing apparel worn by a fisherman and a resiliently flexible container support member comprising an elongated helical spring secured at one end to said mounting means to project generally upwardly therefrom with said mounting means positioned as aforesaid, the upper end of said spring being supportingly connected to the bottom of said container generally centrally thereof normally holding the latter in its upright position by reason of the inherent stiffness of said spring, said spring having sufficient length and flexibility to permit bending the spring reversely upon itself at will to permit tipping and shaking of said container bodily for dispensing salmon eggs therein through said cover opening.

2. The device defined in claim 1 wherein the mounting means comprises a clip adapted for detachable securement to the fisherman's trousers' belt, and wherein the container has a downwardly projecting element on the bottom thereof over which the upper end of said spring is threaded to provide the supporting connection to the container.

References Cited in the file of this patent
UNITED STATES PATENTS

| Number | Name | Date |
|---|---|---|
| 753,683 | Dixon | Mar. 1, 1904 |
| 1,611,275 | Lewis | Dec. 21, 1926 |
| 1,886,106 | Kean | Nov. 1, 1932 |
| 2,085,161 | Kraus | June 29, 1937 |
| 2,160,436 | Jones | May 30, 1939 |
| 2,443,861 | Johnston | June 22, 1948 |
| 2,560,381 | Babington | July 10, 1951 |
| 2,594,545 | Emens | Apr. 29, 1952 |
| 2,698,165 | Rosenthal | Dec. 28, 1954 |